United States Patent
Avenel et al.

(10) Patent No.: US 12,173,750 B2
(45) Date of Patent: Dec. 24, 2024

(54) HINGE FOR ARTICULATING TWO PANELS OF AN AIRCRAFT PROPULSION ASSEMBLY

(71) Applicant: SAFRAN NACELLES, Gonfreville-l'Orcher (FR)

(72) Inventors: Philippe Avenel, Moissy-Cramayel (FR); Xavier Lore, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 261 days.

(21) Appl. No.: 17/995,466

(22) PCT Filed: Apr. 2, 2021

(86) PCT No.: PCT/FR2021/050593
§ 371 (c)(1),
(2) Date: Oct. 4, 2022

(87) PCT Pub. No.: WO2021/205105
PCT Pub. Date: Oct. 14, 2021

(65) Prior Publication Data
US 2023/0174244 A1 Jun. 8, 2023

(30) Foreign Application Priority Data
Apr. 10, 2020 (FR) ...................................... 2003640

(51) Int. Cl.
*F16C 11/10* (2006.01)
*B64D 29/06* (2006.01)

(52) U.S. Cl.
CPC .............. *F16C 11/10* (2013.01); *B64D 29/06* (2013.01)

(58) Field of Classification Search
CPC .......... F16C 11/10; F16C 11/02; F16C 35/02; F16C 43/02; F16C 2226/72;
(Continued)

(56) References Cited

U.S. PATENT DOCUMENTS

| | | | | |
|---|---|---|---|---|
| 5,807,007 A | * | 9/1998 | Stemper .................. | F16C 11/02 403/325 |
| 2011/0120143 A1 | * | 5/2011 | Soulier .................. | B64D 29/06 60/798 |
| 2017/0174354 A1 | * | 6/2017 | Ciprian .................. | B64D 29/08 |

FOREIGN PATENT DOCUMENTS

| | | |
|---|---|---|
| EP | 3 184 434 A1 | 6/2017 |
| EP | 3 553 331 A1 | 10/2019 |

(Continued)

OTHER PUBLICATIONS

English translation of Written Opinion mailed Jul. 9, 2021, issued in corresponding International Application No. PCT/FR2021/050593, filed Apr. 2, 2021, 5 pages.
(Continued)

*Primary Examiner* — Kenneth Bomberg
*Assistant Examiner* — Eric A Lange
(74) *Attorney, Agent, or Firm* — CHRISTENSEN O'CONNOR JOHNSON KINDNESS PLLC

(57) ABSTRACT

An aircraft propulsion assembly has a hinge for articulating a first and a second of its panels. The hinge includes a yoke rigidly connected to the first panel and a counter-yoke rigidly connected to the second panel, which is received between two lugs of the yoke. The yoke and the counter-yoke are passed through by a hinge pin that is movable between an extended position between the lugs of the yoke and a retracted position outside the yoke. The hinge further includes bayonet mounting means interposed between the pin and the yoke.

8 Claims, 11 Drawing Sheets

(58) Field of Classification Search
CPC .... F16C 2326/43; F16C 11/045; B64D 29/06; Y10T 403/32893; Y10T 403/32918
See application file for complete search history.

(56) References Cited

FOREIGN PATENT DOCUMENTS

| | | | |
|---|---|---|---|
| FR | 817184 A | 8/1937 | |
| FR | 3095480 A3 * | 10/2020 | ............. B64D 29/06 |
| WO | WO-0116450 A1 * | 3/2001 | ........... E05D 7/1011 |

OTHER PUBLICATIONS

International Preliminary Report on Patentability mailed Oct. 6, 2022, issued in corresponding International Application No. PCT/FR2021/050593, filed Apr. 2, 2021, 6 pages.
International Search Report mailed Jul. 9, 2021, issued in corresponding International Application No. PCT/FR2021/050593, filed Apr. 2, 2021, 5 pages.
Written Opinion mailed Jul. 9, 2021, issued in corresponding International Application No. PCT/FR2021/050593, filed Apr. 2, 2021, 5 pages.

* cited by examiner

HINGE FOR ARTICULATING TWO PANELS OF AN AIRCRAFT PROPULSION ASSEMBLY

TECHNICAL FIELD OF THE INVENTION

The invention relates to an aircraft propulsion assembly comprising an articulation hinge between two of its panels, in particular panels of a nacelle allowing the access to a turbomachine housed in that nacelle.

TECHNICAL BACKGROUND

A nacelle of an aircraft propulsion assembly comprises a nacelle in which is housed a turbojet engine, this nacelle typically comprising at least two articulated panels in elytron which allow the access to the turbojet engine. The articulation hinges of these panels, for obvious reasons of protection and aerodynamics, are generally carried by inner faces of the panels and walls of the nacelle in order to avoid any aerodynamic drag. As a result, the hinges are not easily accessible, making them difficult to assemble.

Such an articulation hinge comprises a clevis, secured to one of the panels, between the ears of which is received a counter-clevis, which is articulated in the clevis by means of an axle passing through the counter-clevis and the ears of the clevis.

Conventionally, the axle consists of a screw, one head of which is supported on one of the ears of the clevis, and which is immobilized against the opposite ear of the clevis by a nut. Such a design is described in the document EP-3.184.434-A1.

The disadvantage of this design is that a spanner is required on each side of the clevis to tighten the screw, a manipulation which is not easy to do due to the limited space available. It is not possible to transpose to such a hinge the teachings of the document FR-817.184, which describes a furniture hinge with two opposing extractable axles, as this solution would not solve the accessibility problem.

To overcome this drawback, devices such as the one described in the document US-2008/0056814-A1 comprise an axle equipped with a small diameter ball expandable device. Its introduction is carried out from one side of the clevis and then, by means of a control located on the side where it is introduced into the clevis, the ball device is extended so that it can allow its locking on the opposite side of the clevis.

The disadvantage of this design is that, due to the small size of the balls, the device has only limited resistance to vibration, so that the axle can be unlocked and extracted from the hinge by the vibrations alone, with the consequent risk of losing the panel.

Other devices have also been considered, such as the one in the document EP-3.553.331-A1 comprising an axle that is axially immobilized by an expandable device.

There is therefore a real need for an aircraft propulsion assembly comprising a first and a second panel between which is arranged a hinge equipped with an axle that can be introduced on one side of the clevis and thus guaranteeing a reliable locking of it in the hinge. Furniture hinges of this type are known from the document WO-01/16450-A1, but have never been applied to the articulation of such panels.

SUMMARY OF THE INVENTION

The invention meets this need by providing a new hinge design comprising an axle that can be introduced into one side of the clevis and can be firmly locked into the clevis.

To this end, the invention proposes a propulsion assembly comprising a nacelle in which a turbojet engine is housed, said nacelle comprising at least a first and a second panel between which is arranged an articulation hinge comprising a clevis secured to the first panel and a counter-clevis, secured to the second panel, which is received between two ears of the clevis, the clevis and counter-clevis being passed through by an articulation axle, movable between an extended position between the ears of the clevis and a retracted position outside the clevis, characterised in that the hinge comprises bayonet mounting means interposed between the axle and the clevis.

The bayonet mounting means are well known in the prior art in general engineering. Such a mounting means consists of a device for attaching an object with a cylindrical base such as an axle equipped with one or more lugs which engage by rotation in detents provided for this purpose in another cylindrical element. It carries out a reversible locking by a translational motion of the axle followed by a limited rotational movement of the axle in order to make the lug or the lugs enter into detents, the security of the locking being obtained by the pressure of an elastic return means on the axle or directly on the lugs in order to keep them in the detents. The unlocking operation can only be carried out by the action of a translational force opposite to the force exerted by the elastic return means, followed by a rotation in the opposite direction to extract the lugs from the detents, and a reverse translational motion of the axle.

According to other characteristics of the propulsion assembly:
   the bayonet mounting means comprise:
      two opposing lugs extending radially from the axle,
      a case, a base plate of which is attached to an ear of the clevis outside the clevis, through which the axle passes, and which comprises a barrel extending from the base plate outside the clevis, receiving a mechanism for locking/unlocking the lugs according to an axial and angular position of the axle and a tubular cannon extending from the barrel, which is intended to receive and guide the axle in translation and in rotation, to allow the axle to pass from its extended position in the clevis to its retracted position outside the clevis and into the case,
      a handle projecting from the cannon at a free end of the axle, allowing the axle to be manipulated axially and angularly,
   the locking/unlocking mechanism comprises:
      two opposite flat walls, parallel to the axle, in each of which is formed a first slot comprising a slit for immobilising the lugs, oriented perpendicular to the axle, configured to receive and immobilize axially between its transversely oriented edges an end stretch of a corresponding lug, and a window for escaping and introducing the lugs, adjacent to the immobilisation slit, of substantially trapezoidal shape, through which said lug can escape from said wall and from said immobilisation slit upon a rotation of the axle for its unlocking and through an edge of which the lug can be guided towards the immobilisation slit upon a reverse rotation of the axle for its locking,
      at least one means for locking the lugs in the slits for immobilising the first slots,
   the means for locking the lugs comprises cams, diametrically opposed with respect to the axle, carrying notches complementary to intermediate stretches of said lugs and ramps adjacent to said notches, which are received in an internal housing of the barrel about the axle, which are elastically returned in sliding against the lugs by at least one return spring and which are movable between a position in which they immobilize the lugs in the notches and a position in which a pivoting of the axle allows the lugs to stress the ramps of the cams against the force exerted by the at least one return spring and then to leave the slits for immobilising the first slots, the cams are carried, diametrically opposed to each other, by the periphery of a ring which is slipped on about the axle, which is immobilized in rotation with respect to the case, and which is elastically returned against the lugs by a spring slipped on about the axle, supported between the ring and a face of the base plate through which the axle passes, the case comprises two walls, arranged at 90 degrees to the flat walls, in which are arranged two longitudinal guiding slits, diametrically opposed with respect to the axle, which extend longitudinally at least between the barrel and an intermediate portion of the cannon, and which are intended to receive between their edges the lugs after the axle has rotated by 90 degrees and said lugs have escaped from the immobilisation slits, so as to allow the lugs to come out of the case and thus allow the sliding of the lugs and the axle in the cannon so that said axle passes from its extended position in the clevis to its retracted position in the case, the longitudinal guiding slits extend into an intermediate portion of the barrel and the ring is immobilized in rotation with respect to the case by two diametrically opposed arms which extend from the ring and are received in said longitudinal guiding slits, the spring has a diameter smaller than a piercing in the base plate through which the axle passes, piercing through which it is introduced on the axle into the case, and the flat walls of the case each comprise, in the vicinity of the base plate, a second oblong slot, oriented perpendicular to the axle, which is configured to allow at least the lateral introduction of a washer for supporting the spring with a diameter greater than that of said piercing, the lugs are formed by a cylindrical pin sleeved into a piercing transverse of the axle.

The invention also relates to a method for locking and unlocking an axle of a hinge of the type previously described, characterised in that it comprises:

a locking step comprising:
- a first locking sub-step in which, with the lugs of the axle being received in the longitudinal slits, the axle is axially stressed until the lugs stress the ring and compress the spring,
- a second locking sub-step in which the axle is rotated by 90 degrees in a first direction until the lugs, guided by the escape and introduction stretch of the first slot and the ramps of the ring, enter the immobilisation slits of the first slot and the notches of the ring, the axle then occupying its extended position,
- a third locking sub-step in which the axle is released.

an unlocking step comprising:
- a first unlocking sub-step in which the axle is rotated in a second direction until the lugs come out of the notches of the ring and then, by stressing the ramps of the ring and pushing the ring back, leave the slits for immobilising the first slots,
- a second unlocking sub-step in which, by continuing to rotate the axle up to 90 degrees, the lugs leave the first slots and align with the longitudinal guiding slits,
- a third unlocking sub-step in which the axle is released so that the lugs enter the portion of the longitudinal guiding slits extending into the cannon under the effect of the thrust of the ring stressed by the return force of the spring, the axle then occupying its retracted position.

BRIEF DESCRIPTION OF THE FIGURES

Further characteristics and advantages of the invention will become apparent from the following detailed description, for the understanding of which reference is made to the attached drawings in which.

DETAILED DESCRIPTION OF THE INVENTION

Figure 1:
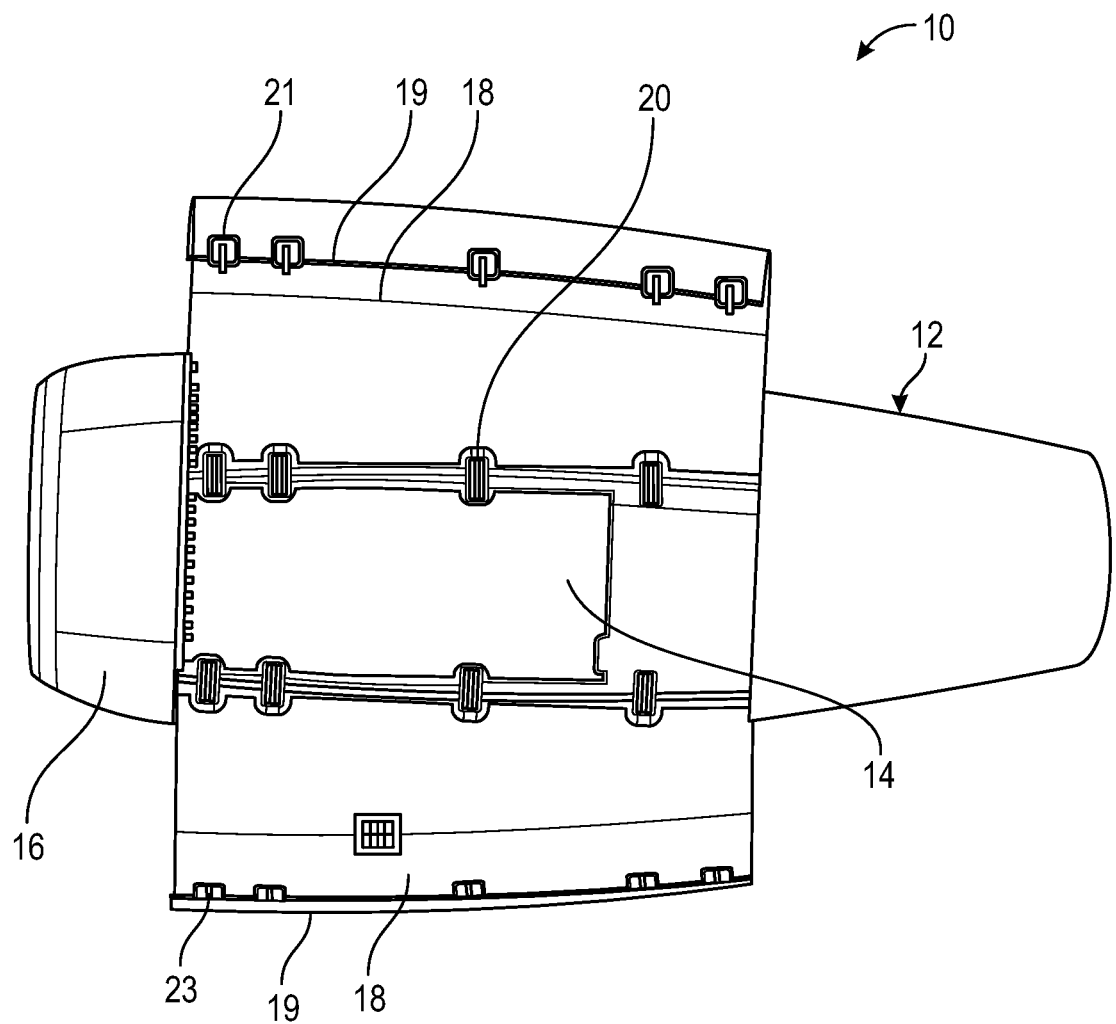
FIG. 1 is a schematic view of the underside of an aircraft nacelle comprising hinges according to the invention.

FIG. 1 shows an aircraft propulsion assembly 10. In a known way, the propulsion assembly 10 comprises a nacelle 12 in which a turbojet engine 14 is housed. The nacelle 12 comprises various stationary panels 16 and at least two pivoting elytron panels 18, which have been shown here in the open position in FIG. 1, and which allow the access to the turbojet engine 14. These pivoting panels 18 comprise free edges 19 which can be locked together by locks 21, 23 in the closed position. They are articulated to the stationary panels by means of hinges 20, which are the subject of the invention.

Figure 2:
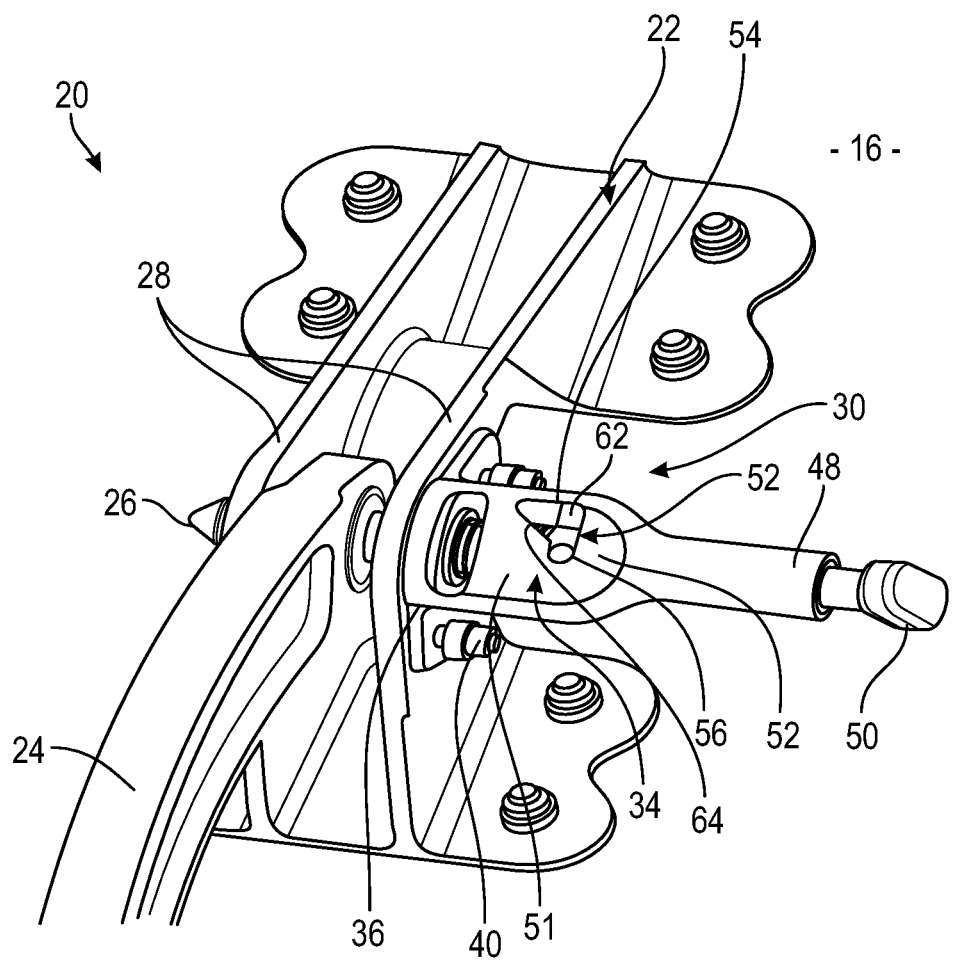
FIG. 2 is a perspective view of a hinge according to the invention.

In a known manner, as illustrated in FIG. 2, each hinge 20 comprises a clevis 22, secured to a first panel, which receives a counter-clevis 24 secured to a second panel. In FIGS. 1 and 2, the clevis 22 is secured to a first stationary panel 16 and the counter-clevis 24 is secured to a second pivoting panel 18, but it will be understood that this arrangement is not limiting of the invention.

As shown in FIG. 2, each hinge 20 comprises an articulation axle 26 between the clevis 22 and the counter-clevis 24.

In particular, the counter-clevis 24 is received between two ears 28 of the clevis 22. The ears 28 of the clevis 22 and the counter-clevis 24 are passed through by the axle 26.

The axle 26 can be extracted from the clevis 22 of the counter-clevis 24 to allow the dismounting of the panels 18. For this purpose it must be movable between an extended position between the ears 28 of the clevis 22, as shown in FIG. 2, and a retracted position outside the clevis 22 which allows the release of the counter-clevis 24.

As can be seen in FIG. 1, the hinges 20 are arranged inside the nacelle 12, so that their axles 26 are not easily accessible, and in particular not easily accessible to spanners allowing a mounting and dismounting by conventional means such as screws and nuts. There is therefore a real need for the axles 26 of these hinges 20 to be mounted without tools and on one side of the hinge 20 only.

To meet this need, the invention proposes bayonet mounting means 30 interposed between the axle 26 and the clevis 22, which allow it to be mounted on and extracted from the clevis 22 from one side of said clevis 22 only.

Figure 9:
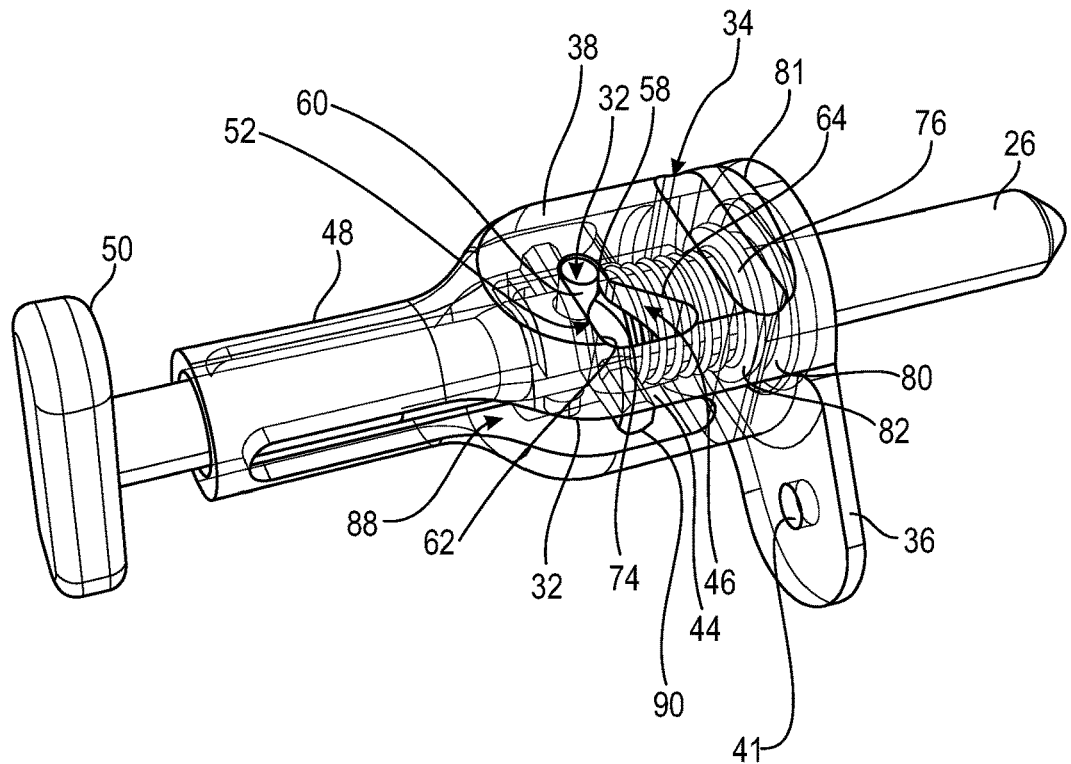
FIG. 9 is a phantom view of FIG. 8.

As illustrated in the phantom view in FIG. 9, the bayonet mounting means 30 comprises firstly two opposing lugs 32 extending radially from the axle 26.

Figure 6:
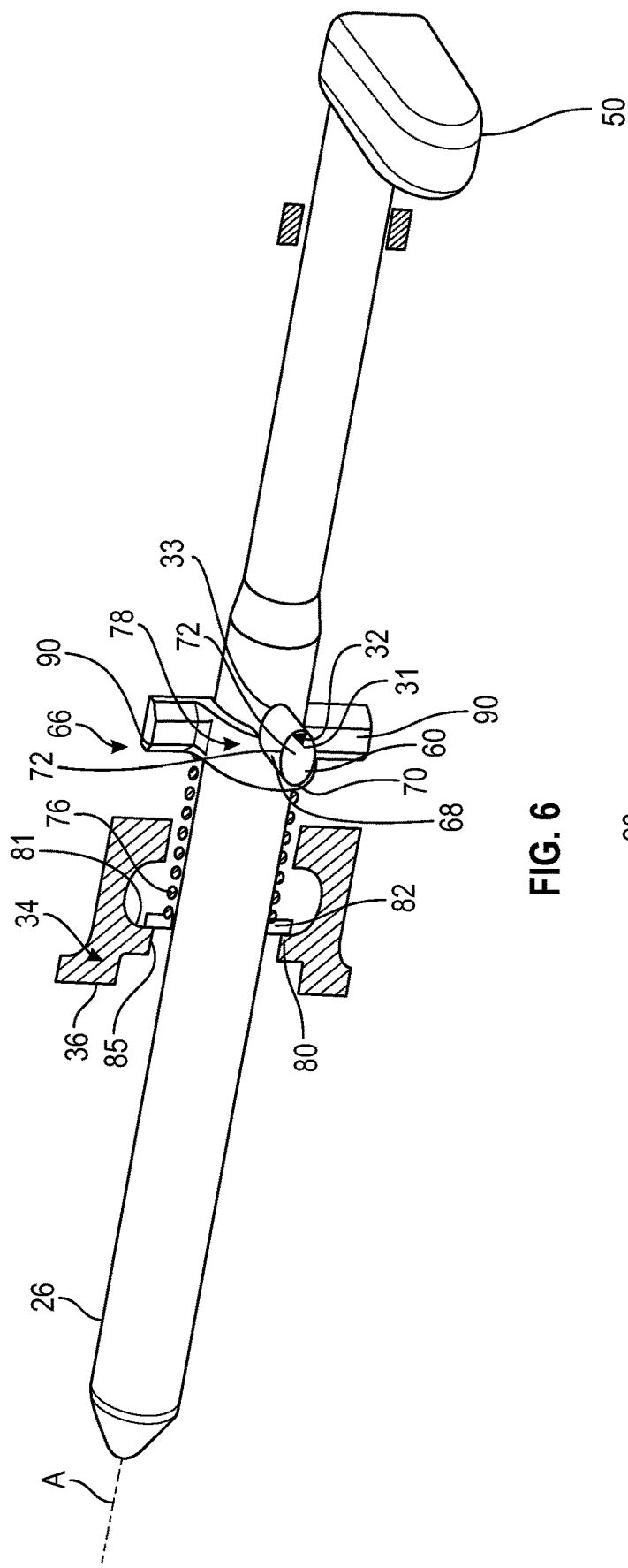
FIG. 6 is a perspective view of the elements internal to the case of the bayonet mounting means.

The lugs 32 are formed, for example, by a single cylindrical pin 31 which is sleeved into a transverse piercing 33 in the axle 26, as shown in FIG. 6.

The bayonet mounting means 30 further comprises a case 34 a base plate 36 of which is attached to an ear 28 of the clevis 22, outside to the clevis 22, as shown in FIG. 2. For example, the base plate 36 is attached by means of screws 40 to the ear 28 of the clevis 22, passing through piercings 41 in the base plate 36.

The case 34 is passed through by the axle 26. The axle 26 passes through a piercing 85 in the base plate 26, as can be seen in particular in FIGS. 3 and 8. The case 34 essentially comprises a barrel 38 extending from the base plate 36 outside the clevis 28, which receives in an internal housing 44, which is more particularly visible in FIG. 4, a mechanism for locking/unlocking 46 the lugs 32 according to an axial and angular position of the axle 26.

Figure 18:
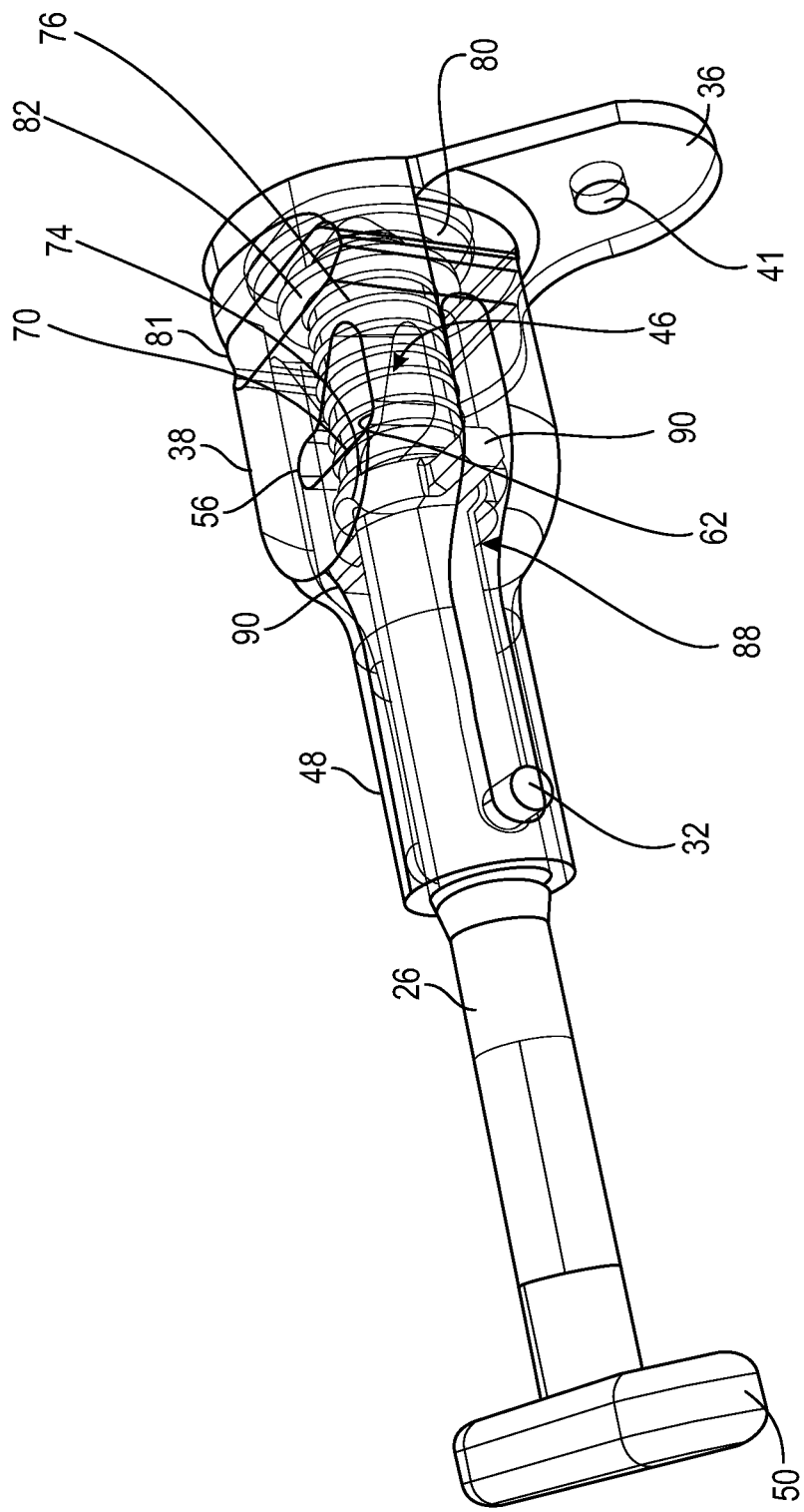
FIG. 18 is a perspective phantom view of the end of the third sub-step of unlocking the axle.

From this barrel 38 extends a tubular cannon 48 which is intended to receive and guide the axle 26 both in translation and in rotation, to allow the axle 26 to pass from its extended position in the clevis 22, as shown in FIGS. 3 to 9, 13, and 14 to its retracted position out of the clevis 22 and into the case 34, as shown in FIG. 18.

As noted, the locking and the unlocking of the axle 26 by the bayonet mounting means 30 is achieved in dependence on the axial and angular position of the axle 26, allowing the locking or the unlocking of the lugs 32, and to this end it comprises a handle 50 projecting from the cannon 48 at a free end of the axle 26, allowing it to be manipulated axially and angularly.

Figure 3:
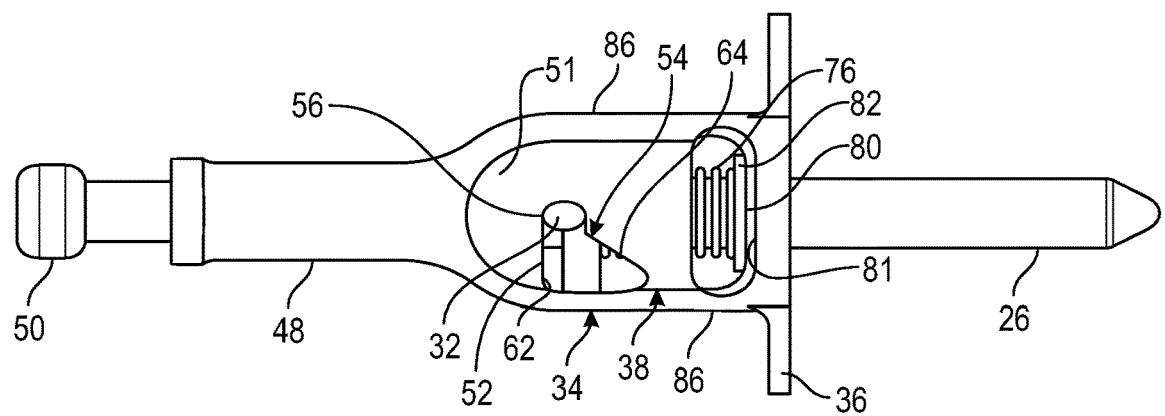
FIG. 3 is a side view of the axle shown locked in the extended position and bayonet mounting means for this axle.
Figure 8:
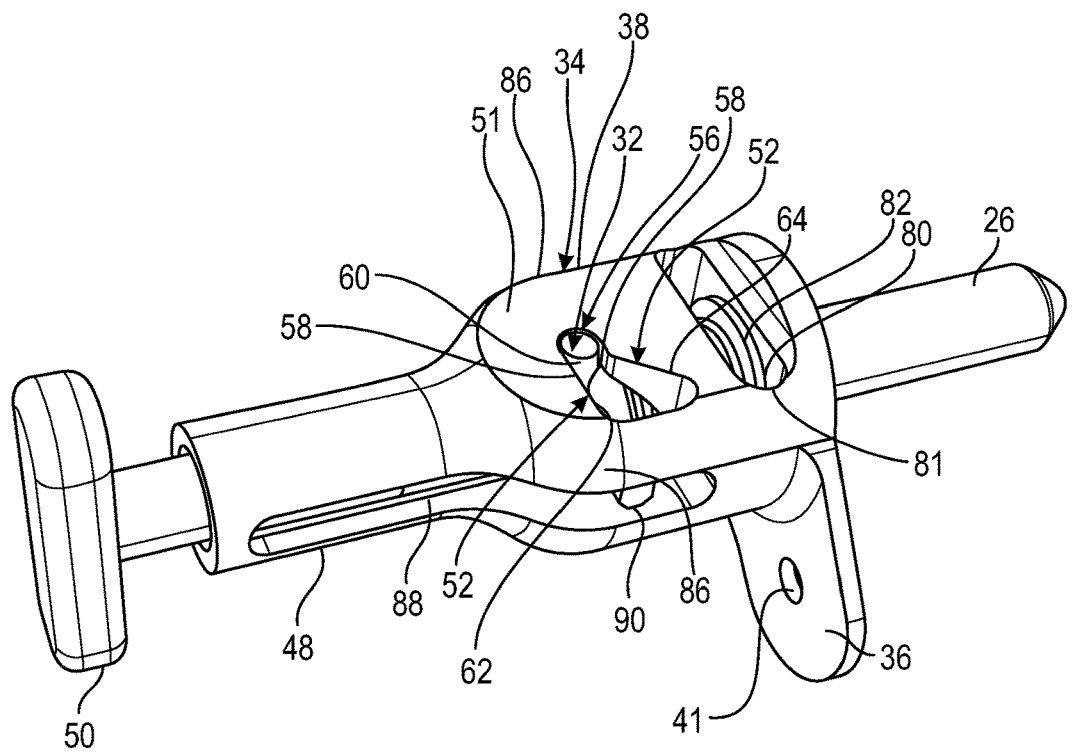
FIG. 8 is a perspective view of the axle shown locked in the extended position and bayonet mounting means for this axle.

As illustrated in FIGS. 3 and 8, in order to allow the locking or the unlocking of the lugs 32, the locking/unlocking mechanism 46 comprises two opposite flat walls 51 of the barrel 38, parallel to the axle 26, in each of which is formed a first slot 52 comprising a slit 56 for immobilising the lugs 32, oriented perpendicularly to the axle 26, and intended to immobilize the lugs 32 axially and consequently the axle 26.

More particularly, as illustrated in FIGS. 8 and 9, each slit 56 comprises transversely oriented edges 58 which are intended to receive and axially immobilize an end stretch 60 of a corresponding lug 32.

Figure 15:
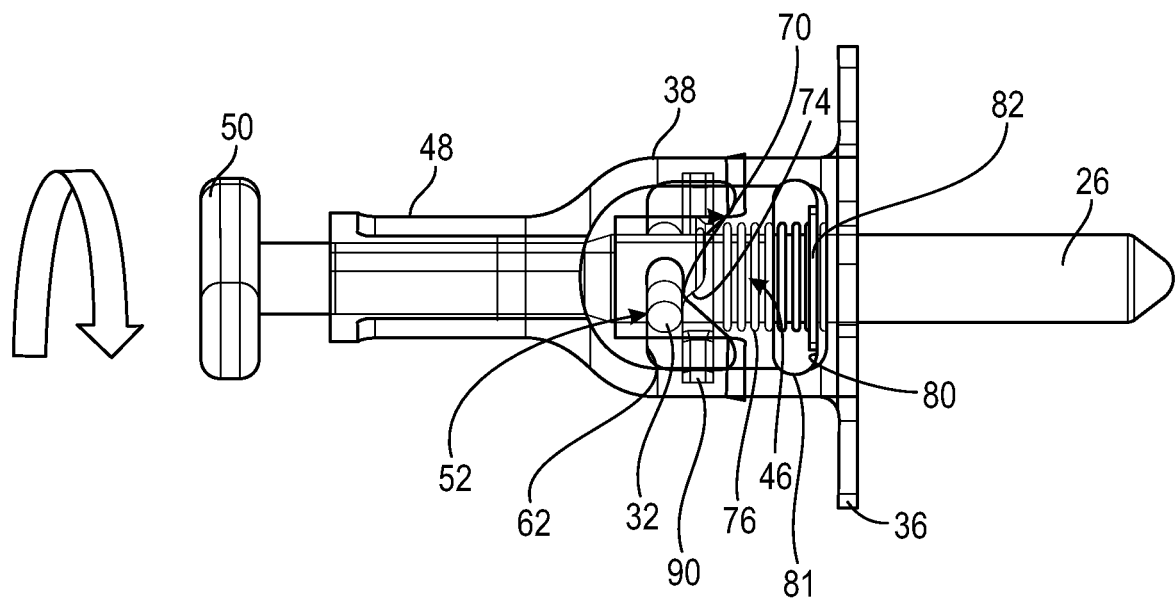
FIG. 15 is a phantom side view during a second sub-step of unlocking the axle.

The first slots 52 also comprise windows 62 for escaping and introducing the lugs 32. Each window 62 is adjacent to and communicates with the immobilisation slit 56 and is trapezoidal in shape. This window 62 allows the release of the lug 32, so that the lug 32 can escape from the immobilisation slit 56 and thus from the wall 51 when the axle 26 is rotated to unlock it, as shown in FIG. 15.

In FIGS. 14 to 18, an unlocking of the lugs 32 is shown, obtained by a rotation of the axle 26 clockwise. It will obviously be understood that if the first slot 52 were reversed with respect to the configuration shown, the unlocking of the lugs 32 would be achieved by a rotation of the axle 26 in the opposite direction, i.e. anticlockwise.

Figure 12:
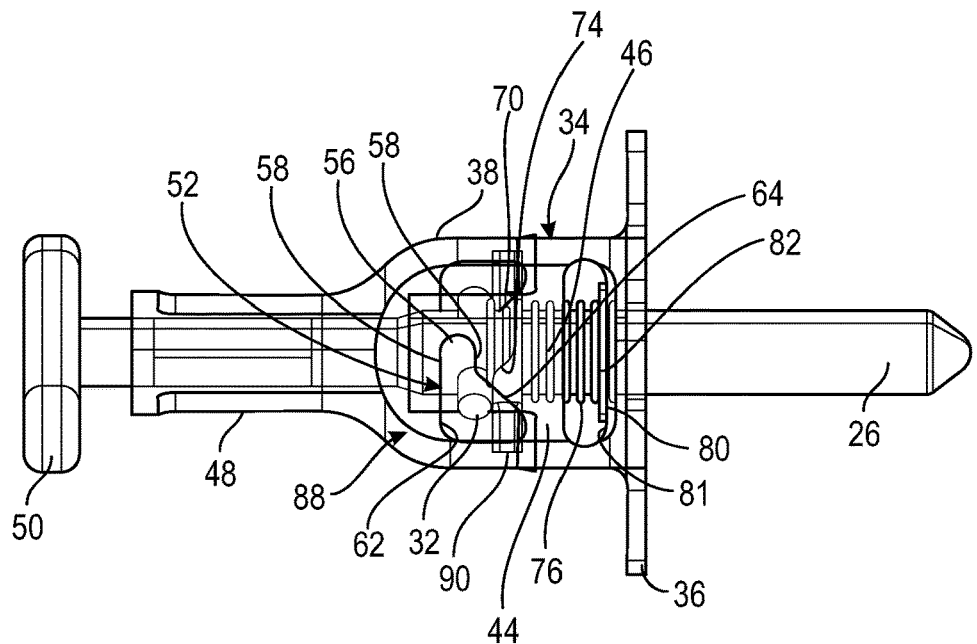
FIG. 12 is a phantom side view during a second sub-step of locking the axle.

The window 62, as can be seen in FIGS. 2 and 3, comprise an inclined edge 64 forming a ramp by which 32 the lug can be guided towards the immobilisation slit on reverse rotation of the axle 26 for its locking, i.e. here in a counter-clockwise direction. This configuration, which has been shown in FIG. 12, shows the lug 32 sliding over the edge 64 before entering the immobilisation slit 56.

It should be noted that the retention of the lugs 32 in the immobilisation slit 56 is achieved by means of a locking means 66 which will now be described.

Figure 7:
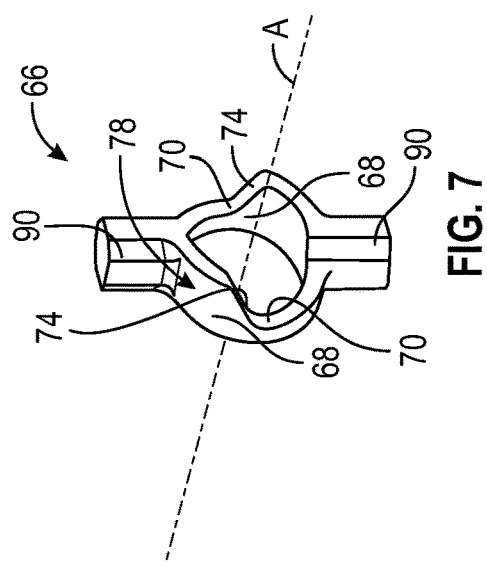
FIG. 7 is a detailed perspective view of a ring forming part of the internal elements of FIG. 6.

In principle, the locking means 66 for the lugs 32, which has been shown in detail in FIGS. 6 and 7, comprises cams 68, diametrically opposed with respect to the axle 26 and elastically returned against the lugs 32. In FIG. 7, the position of the theoretical axis A of the axle 26 is shown.

These cams 68 are received in the internal housing 44 of the barrel 38, around the axle 26.

The cams 68 could be carried by an inner face of the opposing flat walls 51, and be independent of each other.

However, as will be seen in the rest of the present description, the cams 68 are carried by a common element, for reasons of manufacturing simplification.

The cams 68 carry complementary notches 70 in the intermediate stretches 72 of the lugs 32. They therefore do not interfere with the end stretches 60 of the lugs 32 which were shown earlier. The cams 68 also comprise ramps 74 adjacent to the notches 70. Finally, the cams 68 are elastically returned in sliding against the lugs 32 by at least one return spring 76.

The return of the cams 68 by at least one spring 76 has the advantage of guaranteeing the locking of the lugs 32 whatever the vibrations to which the bayonet mounting means 30 are subjected. In particular, it allows to ensure a continuous contact of the cams 68 on the lugs 32, which guarantees the integrity of the hinge 20 and thus the pivoting panels 18.

Figure 13:
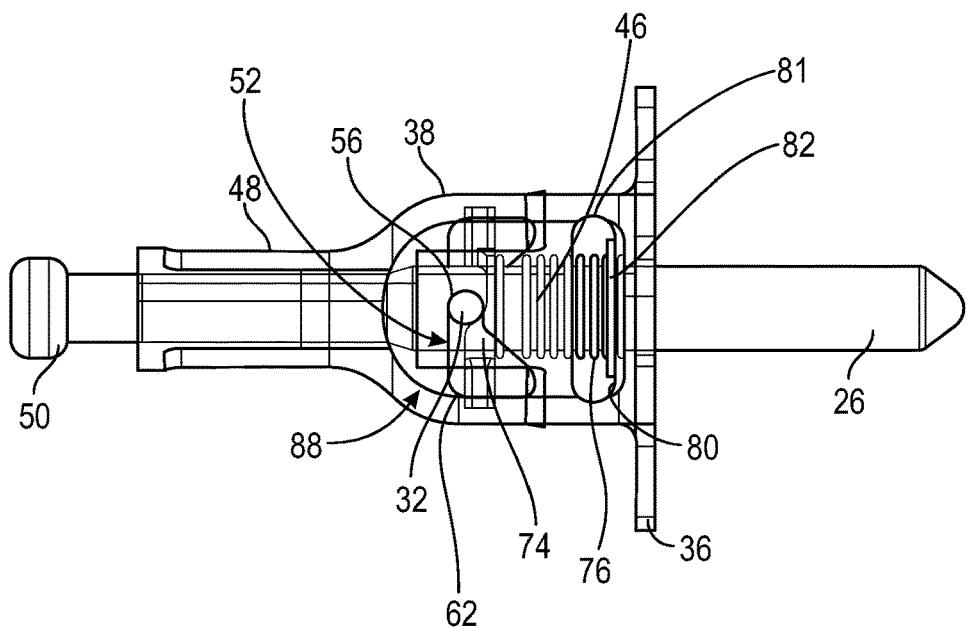
FIG. 13 is a phantom side view of the end of the second sub-step of locking the axle.

It will therefore be understood that if the locking/unlocking mechanism would comprise independent cams 68, these would be returned by two independent return springs 76, but since in the configuration shown here these are carried by a common element, they are therefore returned by a single return spring 76, The cams 68 are movable between a position in which they immobilize the lugs 32 in the notches 70, as shown in FIGS. 6, 9, 13, and a position in which a pivoting of the axle 26, as shown in FIG. 15, allows the lugs 32 to stress the ramps 74 against the force exerted by the at least one return spring 76 and then to leave the immobilisation slits 56 of the first slots 52.

As illustrated in FIG. 6, the cams 68 are carried diametrically opposite each other by the periphery of a ring 78 which is slipped on around the axle 26, and which is immobilized in rotation with respect to the case 34. The ring 78 is elastically returned against the lugs 32 by a single spring 76 which is slipped on about the axle 26 and which is supported between the ring 78 and a face 80 of the base plate 36, the piercing 85 of which is passed through by the axle 26. In this way, the ring 78 stress the lugs 32, particularly when they are received in the notches 70, to lock the lugs 32 and thus immobilize the axle 26 in rotation. The details of how the ring 78 is immobilized in rotation will be described later in this description.

More particularly, the spring 68 is not supported directly on the face 80 of the base plate 36 but, for mounting reasons, on a fitted support washer 82 which is itself supported on this face 80. This washer 82 allows to prevent the spring 68 from escaping from the case. The spring 68 is smaller in diameter than the piercing 85 formed in the bottom face 80 of the case 34 and is introduced into the case 34 on the axle 26 through this piercing 85. In order to prevent the spring 68 from escaping through this piercing 85, the flat walls 51 of the case comprise, each in the vicinity of the base plate 36, a second oblong slot 81, oriented perpendicular to the axle, which is configured to allow at least the lateral introduction of the support washer 82 into the case 34, this washer 82 which receives the spring 68 in a supporting manner and which is of a diameter greater than the piercing 85, thus preventing its escape.

Figure 4:
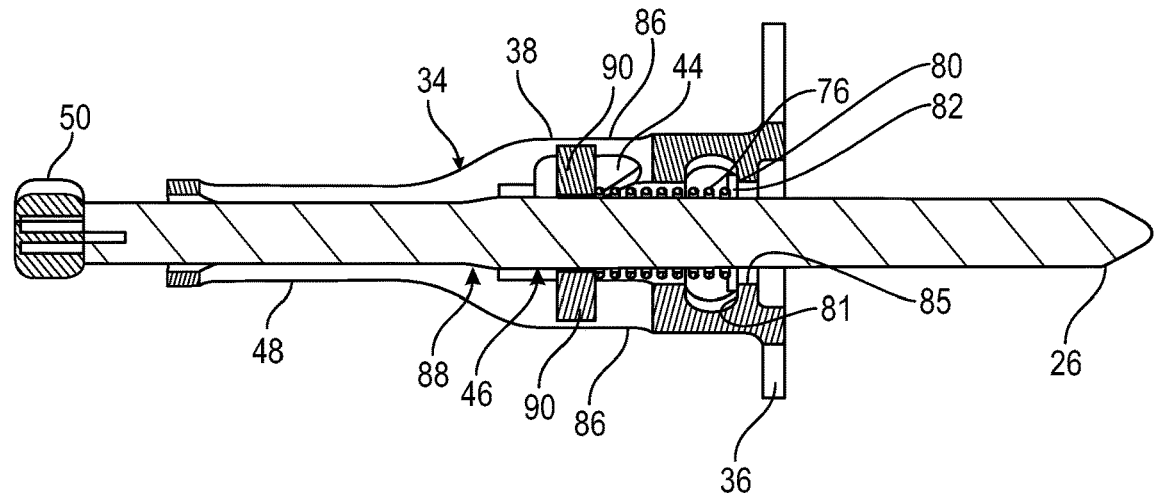
FIG. 4 is a cross-sectional view of the axle shown locked in the extended position and bayonet mounting means for this axle.
Figure 5:
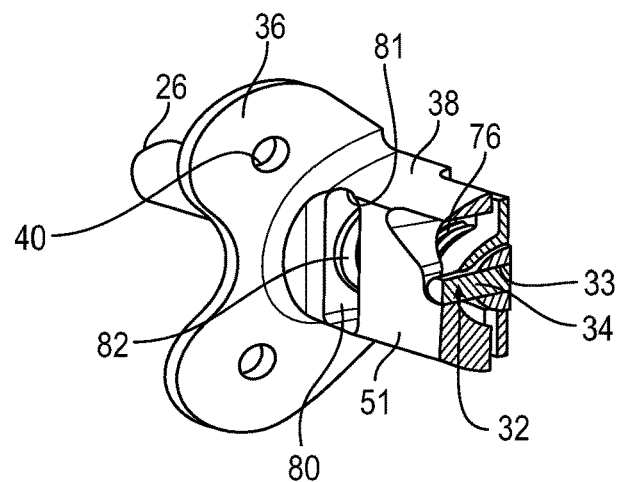
FIG. 5 is a partial perspective view with pull-out of the axle shown locked in the extended position and bayonet mounting means of this axle.
Figure 17:
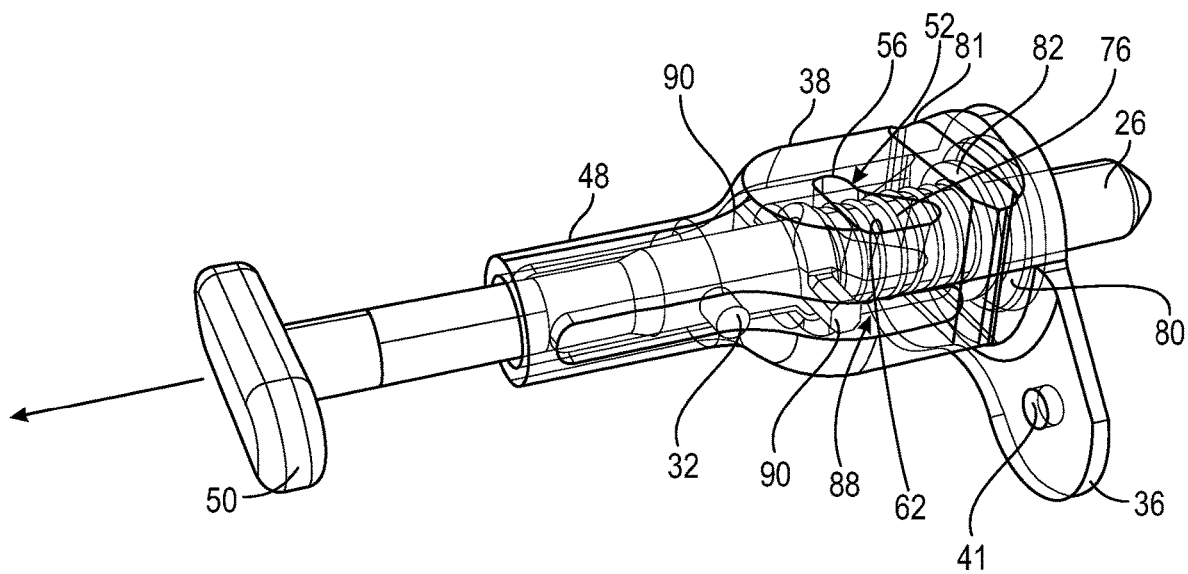
FIG. 17 is a perspective phantom view during a third sub-step of unlocking the axle.

As illustrated for example in FIGS. 3, 4, and 8, in addition to the two opposing flat walls 51, the case 34 comprises two walls 86, arranged at 90 degrees to the flat walls 51, in which are arranged two longitudinal guiding slits 88, diametrically opposed with respect to the axle 26, which extend longitudinally at least between the barrel 38 and an intermediate portion of the cannon 49. These longitudinal slits 88 are intended to receive between their edges the lugs 32 after the axle 26 has rotated by 90 degrees and said lugs 32 have escaped from the immobilisation slits 56, so as to allow the lugs to come out of the case 34 and thus allow the sliding of the lugs 32 and thus the axle 26 in the cannon 48. This allows the axle 26 to be moved backwards from its extended position in the clevis to its retracted position in the case 34, as shown in FIGS. 17 and 18.

Figure 19:
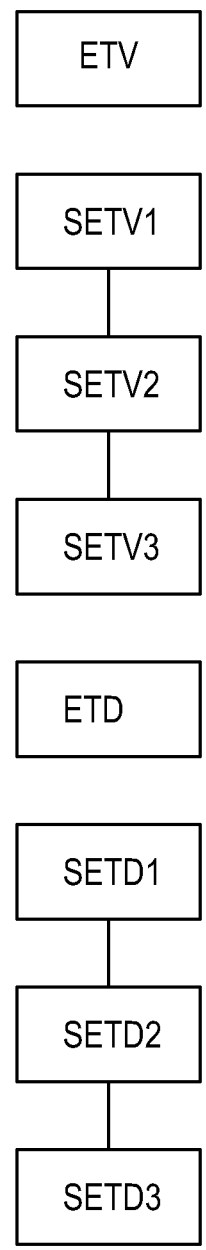
FIG. 19 is a block diagram illustrating the steps of a locking and unlocking method according to the invention.

Advantageously, the guiding slits 88 are not only used to guide the lugs 32 but also allow to immobilize the ring 78. To this end, the longitudinal guiding slits 88 extend into an intermediate portion of the barrel 38 and the ring 78 is rotationally immobilized with respect to the case by two diametrically opposed arms 90 which extend from the ring 78 and are received in said longitudinal guiding slits 88. These arms 90 not only allow to prevent the ring 78 from rotating but also guide its sliding when it is axially stressed by the lugs 32 as will be seen in the rest of this description;

In this configuration, as illustrated in FIG. 19, the axle 26 can be very simply locked and unlocked from the hinge 20 and in particular from the clevis 22 by a method comprising a locking step ETV and an unlocking step ETD.

Figure 10:
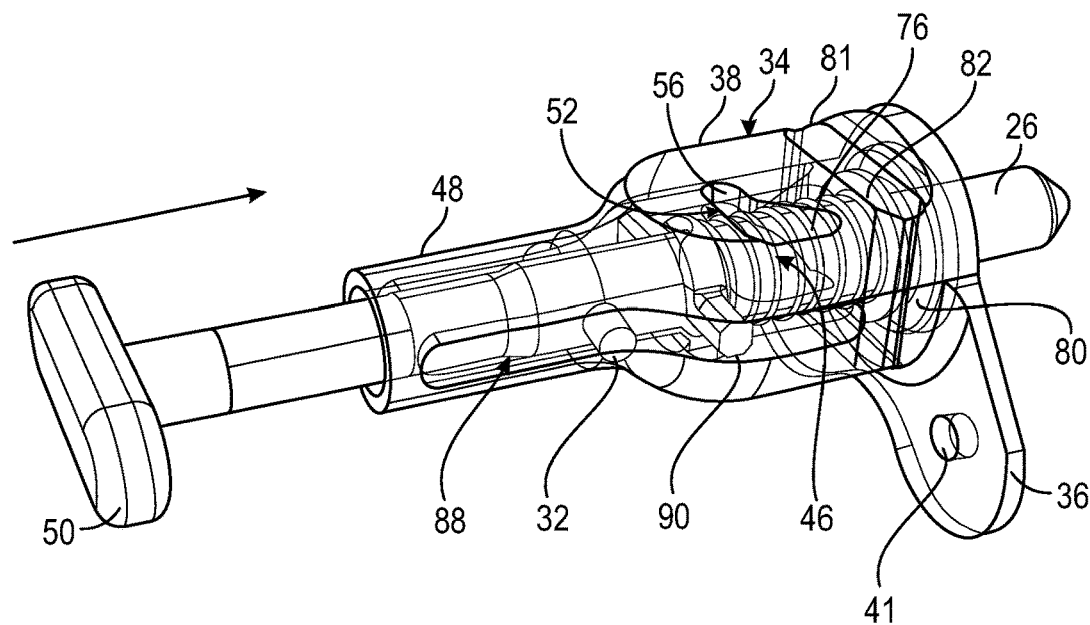
FIG. 10 is a perspective phantom view of the start of a first sub-step of locking the axle.
Figure 11:
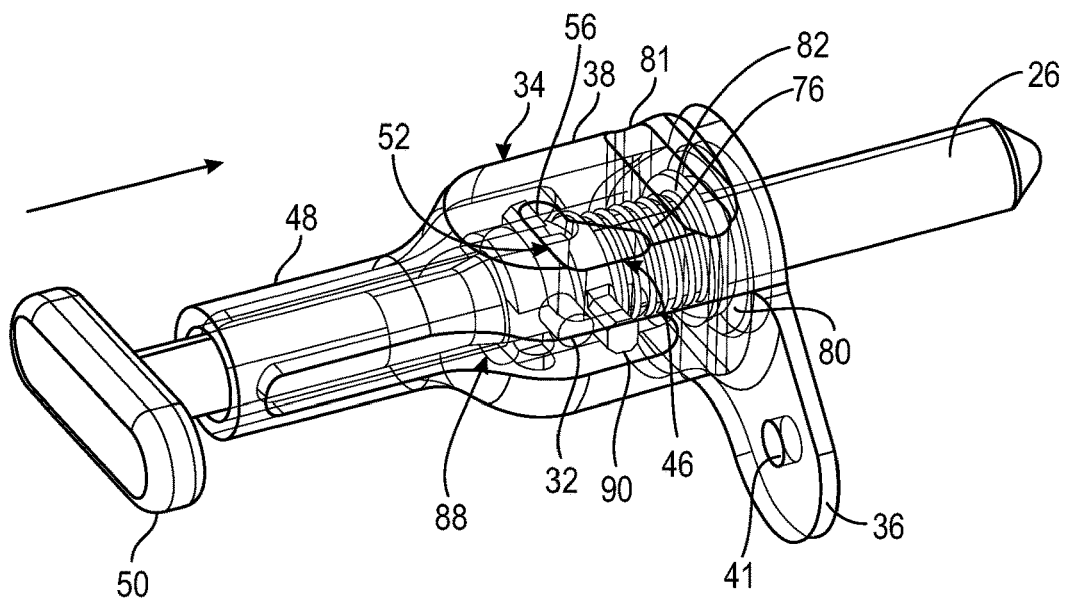
FIG. 11 is a perspective phantom view of the end of the first sub-step of locking the axle.

The locking step ETV comprises a first locking sub-step SETV1 during which, the lugs 32 of the axle being received in the longitudinal slits 88 as shown in FIG. 10, the axle 26 is axially stressed until the lugs 32 stress the ring 78 and compress the spring 76, as shown in FIG. 11. Then, in a second locking sub-step SETV2, the axle 26 is rotated by 90 degrees in a first counter-clockwise direction as shown in FIG. 12 until the lugs 32, guided by the inclined edge 64 of the escape and introduction window 62 of the first slot 52 and by the ramps 74 of the ring 78, as shown in FIG. 12, enter the immobilisation slits 56 of the first slot 52 and into the notches 70 of the ring 78, as shown in FIG. 13, the axle 26 then occupying its extended position, Then the locking step ETV finally comprises a third locking sub-step SETV3 during which the axle 26 is released.

Figure 14:
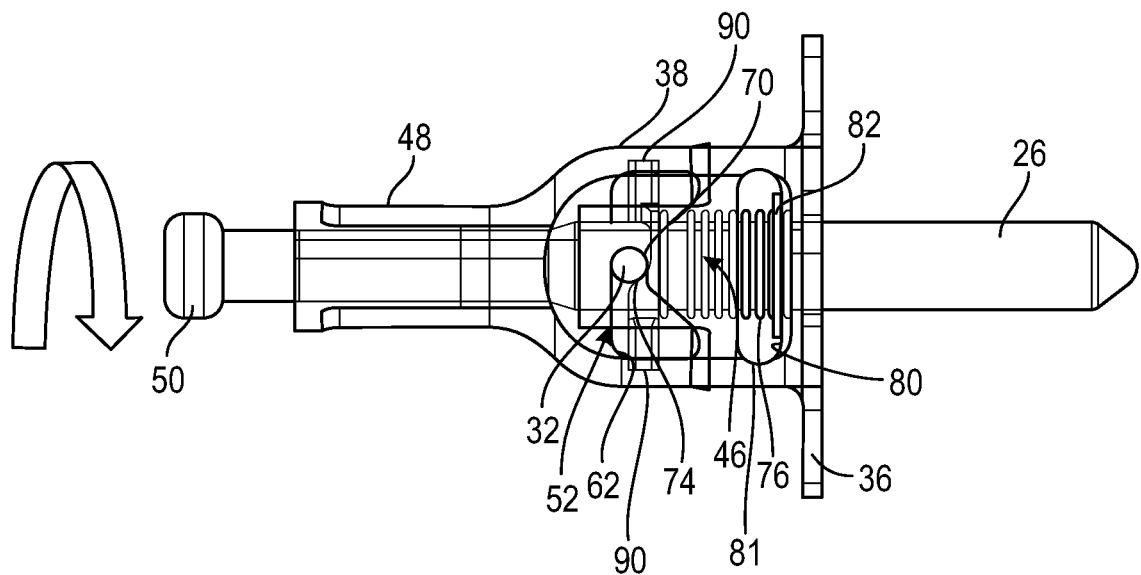
FIG. 14 is a phantom side view of a first sub-step of unlocking the axle.

Conversely, the unlocking step ETD comprises a first unlocking sub-step SETD1 during which, starting from the position of FIG. 14, in which the lugs 32 are received in the immobilisation slits 56, the axle 26 is rotated in a second clockwise direction until the lugs 32 come out of the notches 70 of the ring 78 and then, by stressing the ramps 74 of the ring 78 and pushing the ring 78 back, leave the immobilisation slits 56 of the first slots 52, as shown in FIG. 15.

Figure 16:
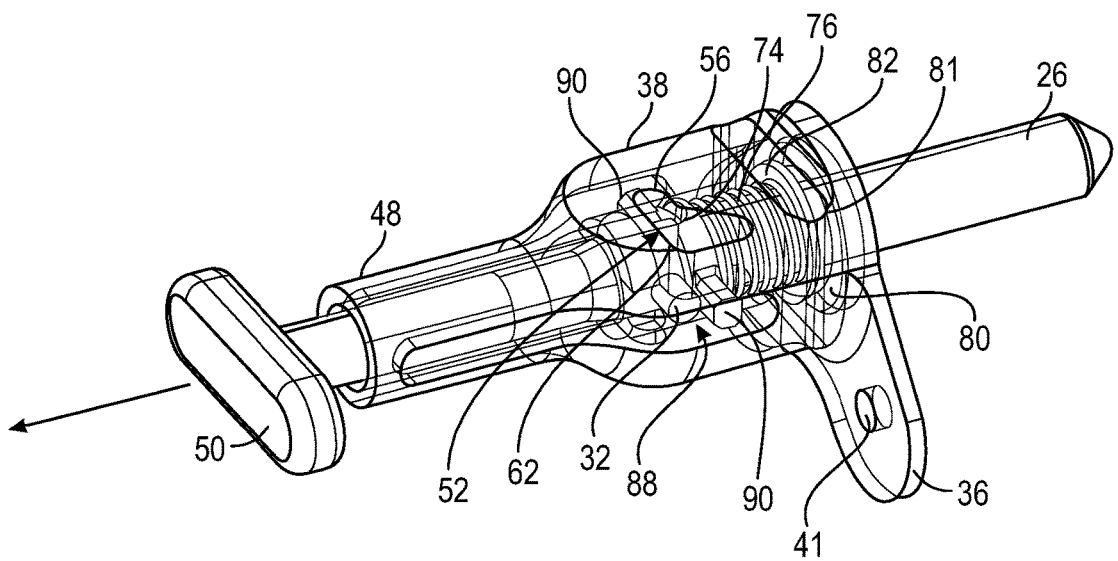
FIG. 16 is a perspective phantom view of the end of the second sub-step of unlocking the axle.

Then the unlocking step ETD comprises a second unlocking sub-step SETD2 in which, by continuing to rotate the axle up to 90 degrees, the lugs leave the first slots 52 and align with the longitudinal guiding slits 88, as shown in FIG. 16.

Finally, the unlocking step ETD comprises a third unlocking sub-step SETD3 during which the axle 26 is released as shown in FIG. 17 so that the lugs 32 penetrate into the portion of the longitudinal guiding slits 88 extending into the cannon 48 under the effect of the thrust of the ring 78 stressed by the return force of the spring 68, the axle 26 moving backwards into the cannon 48 and then occupying its retracted position, as shown in FIG. 18.

The invention thus advantageously allows an axle 26 to be very easily introduced and extracted in a clevis 22 of a hinge 20, on one side of this clevis only, and without tools, simply by manipulating a handle 50. The invention also proposes an efficient and durable locking system that avoids the dismantling of hinges as it was the case in the known devices of the prior art.

The invention claimed is:

1. An aircraft propulsion assembly comprising a nacelle in which a turbojet engine is housed, said nacelle comprising at least a first and a second panel between which is arranged an articulation hinge comprising a clevis secured to the first panel and a counter-clevis, secured to the second panel, which is received between two ears of the clevis, the clevis and counter-clevis being passed through by an articulation axle, movable between an extended position between the ears of the clevis and a retracted position outside the clevis,
  wherein the hinge comprises bayonet mounting means interposed between the axle and the clevis, which comprise:
    opposing lugs extending radially from the axle,
    a case, a base plate of which is attached to an ear of the clevis outside of the clevis, through which the axle passes, and which comprises a barrel extending from the base plate outside of the clevis, receiving a locking/unlocking mechanism for the lugs as a function of an axial and angular position of the axle, and a tubular cannon extending from the barrel, which is configured to receive and guide the axle in translation and in rotation, to allow the axle to pass from its extended position in the clevis to its retracted position outside the clevis and into the case, and a handle projecting from the cannon at a free end of the axle, allowing the axle to be manipulated axially and angularly.

2. The propulsion assembly according to claim 1, wherein the locking/unlocking mechanism comprises:

two opposite flat walls, parallel to the axle, in each of which is formed a first slot comprising a slit for immobilizing the lugs, oriented perpendicularly to the axle, configured to receive and axially immobilize between its transversely oriented edges an end stretch of a corresponding lug, and a window configured to escape and introduce the lugs, adjacent to the immobilization slit, of trapezoidal shape, through which said lug is configured to escape from said wall and from said immobilization slit upon a rotation of the axle for unlocking thereof and through an edge of which the lug is configured to be guided towards the immobilization slit upon a reverse rotation of the axle for its locking, and a means for locking the lugs in the slits for immobilizing the first slots.

3. The propulsion assembly according to claim 2, wherein the locking means for the lugs comprises cams, diametrically opposed with respect to the axle, carrying notches complementary to intermediate stretches of said lugs and ramps adjacent to said notches, which are received in an internal housing of the barrel about the axle, which are elastically returned in sliding against the lugs by at least one return spring and which are movable between a position in which they immobilize the lugs in the notches and a position in which a pivoting of the axle causes the lugs to stress the ramps of the cams against the force exerted by the at least one return spring and then to leave the slits for immobilizing the first slots.

4. The propulsion assembly according to claim 3, wherein the cams are carried, diametrically opposite each other, by the periphery of a ring which is slipped on about the axle, which is immobilized in rotation with respect to the case, and which is elastically returned against the lugs by a single return spring slipped on about the axle, supported between the ring and a face of the base plate passed through by the axle.

5. The propulsion assembly according to claim 4, wherein the case comprises two walls, arranged at 90 degrees to the flat walls, in which are arranged two longitudinal guiding slits, diametrically opposed with respect to the axle, which extend longitudinally at least between the barrel and an intermediate portion of the cannon, and which are configured to receive between their edges the lugs after the axle has rotated by 90 degrees and said lugs have escaped from the immobilization slits, so as to allow the lugs to come out of the case and thus allow the lugs and the axle to slide in the cannon so that said axle passes from its extended position in the clevis to its retracted position in the case.

6. The propulsion assembly according to claim 5 the longitudinal guiding slits extend into an intermediate portion of the barrel and the ring is immobilized in rotation with respect to the case by two diametrically opposed arms which extend from the ring and which are received in said longitudinal guiding slits.

7. The propulsion assembly according to claim 4, wherein the spring has a diameter smaller than a piercing in the base plate through which the axle passes, piercing through which it is introduced on the axle into the case, and in that the flat walls of the case each comprise, in the vicinity of the base plate, a second oblong slot, oriented perpendicular to the axle, which is configured to allow at least the lateral introduction of a washer for supporting the spring of a diameter greater than that of said piercing.

8. The propulsion assembly according to claim 1, wherein the lugs are formed by a cylindrical pin sleeved into a piercing transverse of the axle.

* * * * *